Figure 1:
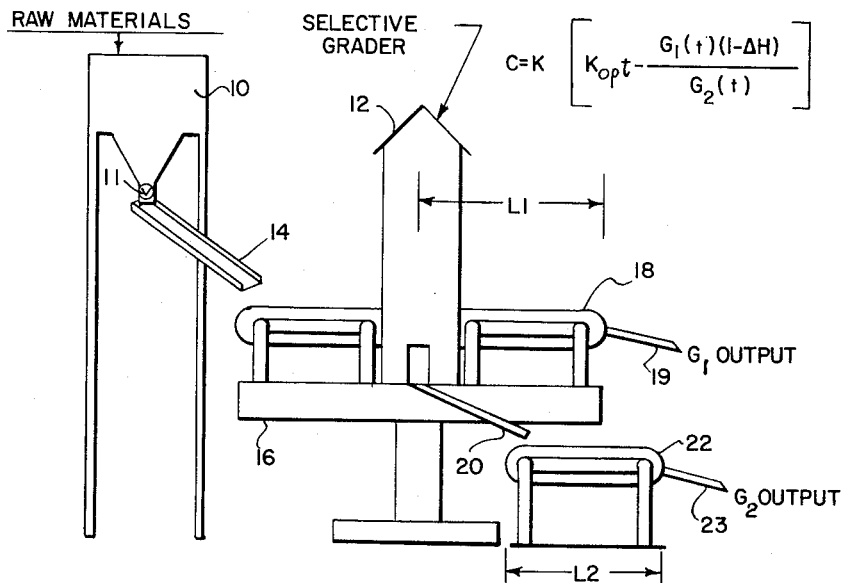

Aug. 22, 1961  B. M. GORDON  2,997,175
ELECTRICAL COMPUTING APPARATUS
Filed Nov. 18, 1958  2 Sheets—Sheet 1

$$C = K \left[ K_{op}t - \frac{G_1(t)(1-\Delta H)}{G_2(t)} \right]$$

INVENTOR.
BERNARD M. GORDON
BY
Weingarten, Crenbure & Pendice
ATTORNEYS

United States Patent Office 2,997,175
Patented Aug. 22, 1961

2,997,175
ELECTRICAL COMPUTING APPARATUS
Bernard M. Gordon, Newton, Mass., assignor to Epsco, Incorporated, Boston, Mass., a corporation of Massachusetts
Filed Nov. 18, 1958, Ser. No. 774,780
4 Claims. (Cl. 209—121)

This invention relates to material control and measuring devices and methods and more particularly to devices and methods for the controlling and measuring of material by utilizing digital operational techniques as disclosed in my paper entitled Adapting Digital Techniques for Automatic Controls in the November and December 1954 issues of Electrical Manufacturing at pages 136 and 120, respectively.

Heretofore, material control and measuring mainly has been manually effected, resulting in inefficient operation and increased cost. In such instances where automatic control has been utilized, mechanical and analog apparatus of great complexity and high cost have been used to take into account various variable factors and optimum control conditions.

It is therefore the primary object of this invention to provide a new and improved control and measuring device and method using operational-digital techniques and accounting for variable factors and the optimum or desired conditions of operation.

Another object of the invention is to provide a new and improved control device and method of high efficiency operating in real time.

Another object of the invention is to provide a new and improved control device and method for automatically effecting optimum or desired operating conditions by measuring material being derived from several outputs of the controlled apparatus.

Another object of the invention is to provide a new and improved device and method for measuring material derived from a source.

Another object of the invention is to provide a new and improved device and method for controlling the rate of delivery of raw material to an apparatus for maintaining desired operating conditions by measuring and comparing the respective rates of delivery of material from several outputs of said apparatus.

Another object of the invention is to provide a new and improved device and method for measuring the rate of delivery of material utilizing a conveyor unit which may receive uneven deposits of material and which may have uneven conveying action without adversely affecting the system.

Another object of the invention is to provide a new and improved control and measuring device and method which can be carried out by equipment which is inexpensive to manufacture, operate and maintain.

The above objects as well as many other objects of the invention are achieved by providing a device which comprises a conveying unit for each material output of an apparatus for carrying the material along a predetermined path, a pulse generator associated with each conveyor unit producing a pulse for each linear displacement of material of a predetermined distance along its path, and a weighing means associated with each conveying unit delivering an output signal corresponding with the weight of the material carried by its units along its path. A binary rate multiplier network is provided for each of the conveyor units. Each network receives input actuating signals from its corresponding pulse generator and rate control signals from its associated weighing means. The signals derived from each of the networks may be delivered through another such network for the purpose of introducing desired variable control factors and optimum or desired control relationships. The signals derived from the multiplier networks associated with the various conveyor units may be compared by delivery to appropriate apparatus such as the forward and backward input terminals of a reversible counter for producing the desired output control signal. The output control signal, for example, may be utilized to control the rate of delivery of raw materials to a grading apparatus to maintain the optimum or desired ratio of delivery of graded materials at its several outputs.

Figure 2:
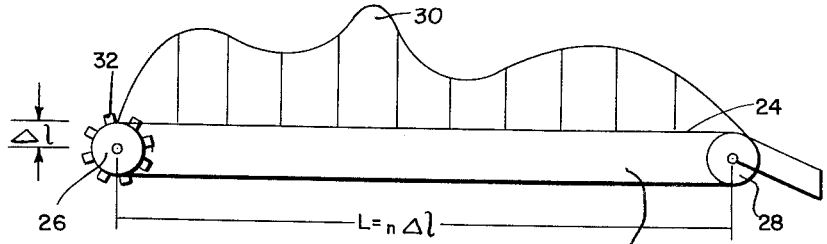
Figure 4:
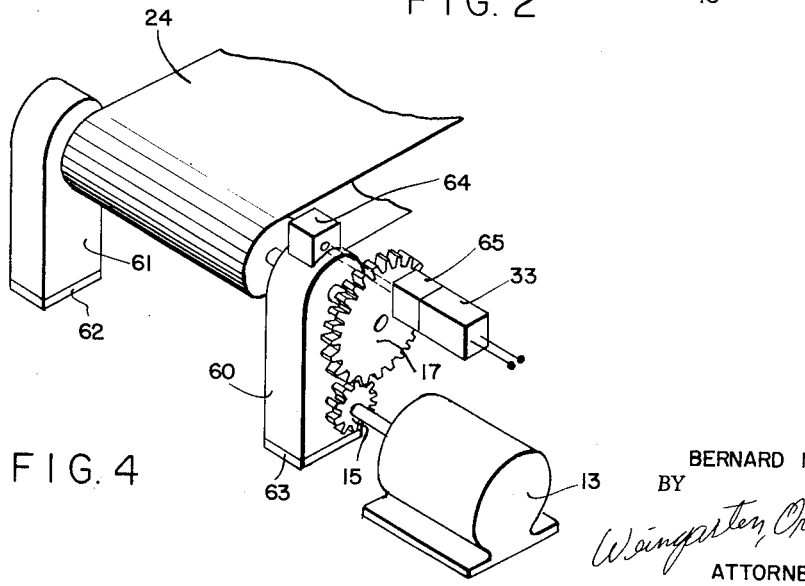
Figure 3:
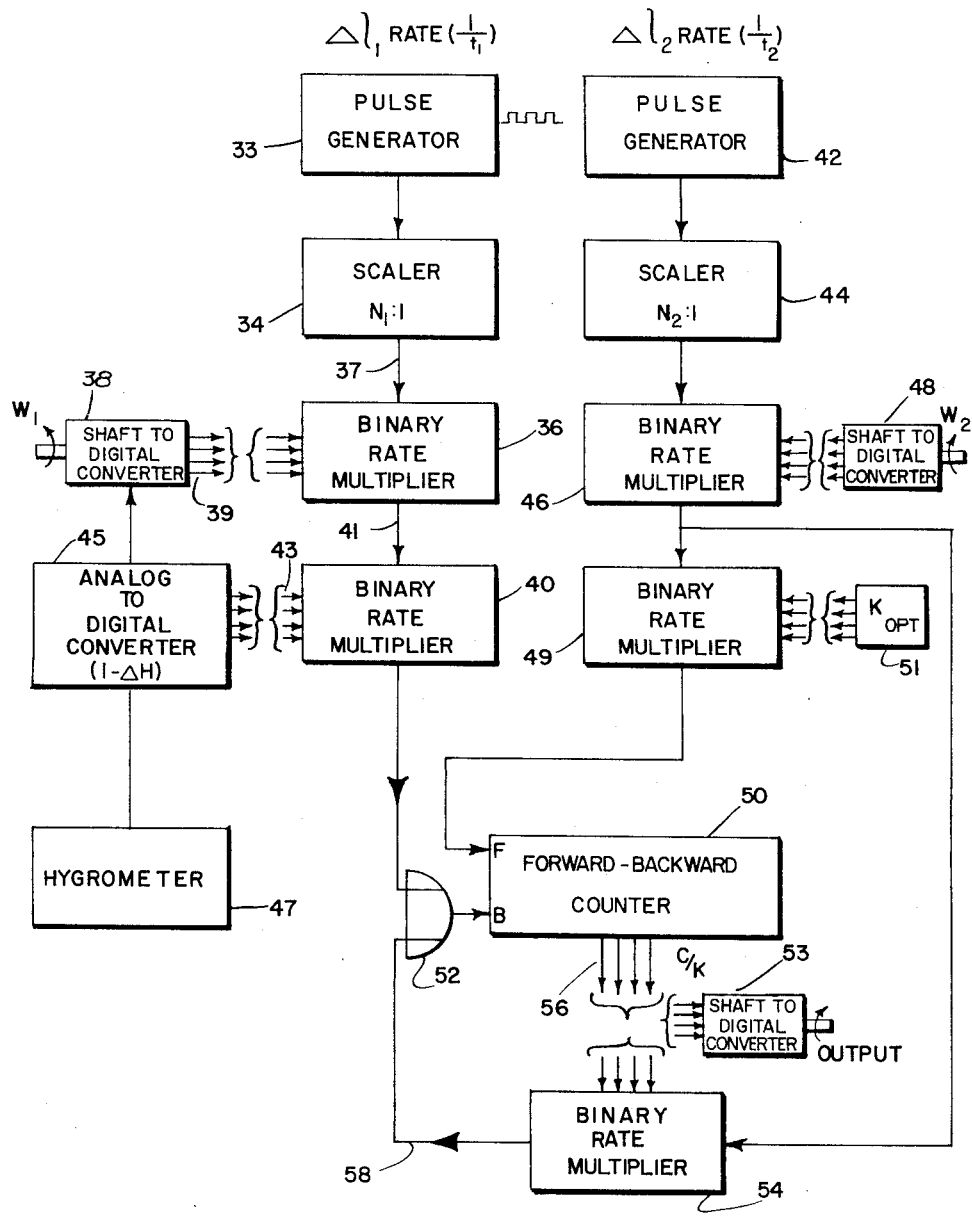

The foregoing and other objects will become more apparent with the following detailed description of a particular embodiment of the invention, reference for this purpose being had to the accompanying drawings, in which:

FIG. 1 diagrammatically illustrates th mechanical features of an embodiment of the invention;

FIG. 2 illustrates in greater detail a conveying unit shown in FIG. 1;

FIG. 3 schematically illustrates in block form the control and measuring features of the invention; and FIG. 4 depicts structural details of the conveyor belt and the placement of measuring devices.

Like numerals designate like parts throughout the several views.

The figures illustrate an embodiment of the control and measuring device and method of the invention. In the illustration, the control and measuring device and method are applied to a grading system for the purpose of controlling the rate at which raw material is delivered to an apparatus for obtaining the optimum rate of feed for the desired operating conditions. The optimum operation is determined by the rate at which various grades of material are produced by the device and takes into account humidity and other such conditions. In the illustration, two grades of material $G_1$ and $G_2$ are produced and the comparison of the rate at which material is delivered from one output with the rate at which material is delivered at the other output, is used to determine the optimum operating conditions of the system.

Although a grading operation is performed in this case, it is noted that the control and measuring device and method of the invention may likewise be applied to other such operations for maintaining desired operating conditions.

A source of raw material is provided by a storage means 10 which has a valve element 11 or equivalent means for adjusting the rate at which material is delivered to a selective grader 12 (see FIG. 1). The raw material may be delivered to the grader 12 by a slideway 14 and a travelling belt conveyor 16. The grader 12 in this case has two outputs delivering material of one grade $G_1$ to a travelling belt output conveyor unit 18, and delivering another grade $G_2$ over a slideway 20 to a second travelling belt output conveyor unit 22. The output conveyor units 18, 22 each respectively provides a path of predetermined length $L_1$, $L_2$ along which it carries material and at the end of which the material $G_1$, $G_2$ is removed over respective outputs 19 and 23.

Refer to FIGURE 2 which shows in greater detail the output conveyor unit 18 which is similar to the output conveyor unit 22, and has a traveling belt 24 which moves about two end wheels 26, 28. Either one of the end wheels 26, 28 may be driven in the clockwise direction to provide movement of the top or material carrying portion of the travelling belt 24 in the clockwise direction towards its output end. If the distance $L_1$ between the centers of the conveyor wheels 26 and 28 is divided into a number $n_1$ of segments $\Delta l_1$, then $$L_1 = n_1 \Delta l_1$$

Similarly in the case of the conveyor unit 22:

$$L_2 = n_2 \Delta l_2$$

FIG. 2 shows the material 30 deposited on the conveyor belt from the output of the selective grader 12 as the conveyor belt 24 moves in the clockwise direction. It will be explained how the deposit of material may be uneven and the movement of the belt may be irregular without adversely affecting the operation of the system.

As indicated in FIG. 4, a pulse generator 33 is arranged so that a pulse signal is produced with each displacement of the conveyor belt 24 in the linear direction toward its output end for each distance $\Delta l_1$. This is achieved by driving the conveyor belt 24 by means of a motor 13 having a pinion 15 meshed with a gear 17 having teeth 32. The gear 17 is keyed to a shaft 27 journaled in supports 60 and 61 which rest upon strain gages 62 and 63. The strain gages are arranged in known manner to measure the weight placed upon supports 60 and 61. A source of light 64 is placed to project a beam through the space between adjacent gear teeth 32 toward a photoelectric sensing element 65. The sensing element is associated with pulse generator 33 in a manner such that the generator produces a train of pulses which is a measure of the displacement of conveyor belt 24.

Referring to FIG. 3, the train of signals produced by the pulse generator 33 associated with the conveyor unit 18 is delivered to a scaling device 34 which delivers its output signals over line 37 to a binary rate multiplier network 36.

The binary rate multiplier 36 may be of the type described in an article by Bernard M. Gordon and R. N. Nicola entitled "Special Purpose Digital Data Processing Computers" appearing in the Proceedings of the Association for Computing Machinery of May, 1952.

The rate control input lines 39 of the binary rate multiplier network 36 are continuously energized by a shaft to digital converter 38 which is actuated by the weighing devices associated with conveyor unit 18 to deliver binary coded output signals in parallel form corresponding to the weight of the material carried by the unit 18 along its path.

The train of output signals from the network 36 is delivered to the input line 41 of a binary rate multiplier 40 which receives humidity information on its rate control lines 43 in the form $(1-\Delta H)$ from an analog to digital converter 45 which, in turn, receives its analog input from a hygrometer unit 47 which may be of the type disclosed in United States Patent No. 2,930,016.

The output conveyor unit 22 is similarly provided with a pulse generator 42 operating in a like manner. The pulse generator 42 delivers a train of signals at a rate corresponding to the conveying speed of the unit 22 and energizes a scaling device 44 which delivers its output to a binary rate multiplier 46.

The rate control lines of the binary rate multiplier 46 continuously derive information signals from a shaft to digital converter 48. The shaft to digital converter 48 delivers output signals which correspond to the weight, sensed by strain gages, of the material being carried by the conveyor unit 22 along its path.

The output from the multiplier network 46 is delivered to the input line of a binary rate multiplier network 49. The input control lines of the network 49 receive information signals $K_{opt}$ from a digital code generating unit 51 which determines the optimum or desired operating conditions of the grading apparatus.

A binary counter 50 of the reversible type has its forward input lead F energized by the signals from the binary multiplier network 49, while its backward input lead B receives signals through a buffer 52 from the output of the binary rate multiplier network 40.

A binary rate multiplier network 54 has its input line energized by the output signals from the binary rate multiplier 46, while its rate control lines are continuously energized by the information output lines 56 of the counter 50. The output signals from the binary rate multiplier network 54 are delivered over the line 58 and through the buffer 52 to the backward input B of the counter 50.

In operation, the grading process is a continuous one in which raw material is fed through valve 11 into the selective grader 12 in controllable quantities. The nature of the process is such that several grades $G_1$ and $G_2$ of the product are manufactured at the same time and these grades are sorted. Experience has shown that the process is being carried out properly when the various grades $G_1$ and $G_2$ of the product are produced in a certain ratio. The device determines the ratio of the grades of the product being manufactured and appropriately controls the flow of raw material into the process so as to continuously maintain the optimum ratio for the most efficient production.

Because of the nature of the product, the finer grade $G_1$ is effected by atmospheric humidity, and therefore, in determining the rate of manufacture of this grade, the humidity must be taken into account.

It is desired to determine and compute the control relationship $$C = k\left[K_{opt} - \frac{G_1(t)(1-\Delta H)}{G_2(t)}\right]$$

where $K_{opt}$ = optimum ratio of rate of manufacture of grade $G_1$ and grade $G_2$
$G_1(t)$ = rate of manufacture of grade $G_1$ at time $t$
$G_2(t)$ = rate of manufacture at grade $G_2$ at time $t$
$\Delta H$ = differential humidity with respect to a reference humidity.

When C is equal to zero, the process is being carried out for most efficient production, and no change in the control state is required. When C is positive, the ratio is less than the optimum ratio, and the input valve element controlling the raw material must be opened farther to allow delivery of more raw material. Conversely, if C is negative, the ratio is too great, and the rate of flow of the raw material should be reduced.

The device of the invention determines the rate of manufacture of the two grades $G_1$ and $G_2$ as they respectively pass over the belts of the conveyor units 18 and 22 and computes the control relationship C by supplying the necessary instrumentation for multiplication, division and subtraction.

As illustrated by FIG. 2, the material comes off the slideway onto the conveyor belt at a non-uniform rate. Further, the conveyor belt action is not particularly smooth. The control and measuring device must accurately determine both the amount of material on the conveyor belt and the rate at which the conveyor belt is moving. The device effectively multiplies the net weight of each of the belts of the conveyor units 18, 22 by the rate at which it is moving.

The pulses derived from the generators 33, 42 of the conveyor units 18, 22 have a unitary weighted code value representing a predetermined amount of motion of the conveyor belt $\Delta l$. Thus, each time a pulse is generated by the device drive wheel generator, it indicates a fixed motion of the belt regardless of the speed of the belt or any discontinuities in its motion.

It is clear that if the load distribution of the conveyor belts were uniform, each pulse produced by the generators 33, 42 would not only indicate a known motion of its conveyor belt, but would also indicate that a known amount of produced material has been removed from the end of the belt.

For the non-uniform distribution that is actually encountered, it is necessary to determine the average rate at which material is passing down the conveyor belt. It may be mathematically rigorously demonstrated that, if the entire conveyor belt is weighed so as to obtain its net weight (the total weight of material on that belt), and if this weight is continuously multiplied by the rate of pulses from the pulse generator 33, 42, then, this product is accurately related to the rate of motion of the material on the conveyor belt or the rate at which it is being manufactured, delivered to, or removed from the conveyor unit 18, 22.

Thus when the length L and the drive distance $\Delta l$ are known, pulse data may be obtained such that each pulse represents a known amount of produced material. In this manner the rate of manufacture of material may be obtained by multiplying the rate of occurrence of these pulses and the weight information, while the total amount of material produced up to any time may be measured merely by counting such product.

Referring to FIG. 3, the pulses derived from the generator 33 of the conveying unit 18 are delivered to the binary rate multiplier 36 through the scaler 34, while the signals from the pulse generator 42 are delivered through the scaler 44 to the multiplier network 46.

The conveyor pulse trains derived from the generators 33 and 42 are respectively scaled down by factors $n_1$ and $n_2$. This scaling has the effect that each pulse, whether received from conveyor unit 18 or conveyor unit 22 has the same representative value, since $n_1$ equals the ratio $\Delta l_1$ to $L_1$ and $n_2$ equals the ratio of $\Delta l_2$ to $L_2$.

The train of signals delivered by the scaling device 34 to the rate multiplying network 36 is multiplied by the weight information received from the shaft to digital converter 38. The output train of pulse signals from the network 36 is delivered to the binary rate multiplier network 40 which multiplies it by the humidity factor $(1-\Delta H)$. The information derived from the output of the network 40 is delivered through the buffer 52 to the backward input B of the counter 50 causing it to count in the backward direction.

In a similar manner, the pulse information derived from the scaling device 44 and delivered to the binary multiplier 46 is multiplied by the weight information received from the shaft to digital converter 48 associated with the conveyor unit 22. The train of pulse signals from the network 46 is delivered to the binary rate network 49 which multiplies it by a factor $k_{opt}$ for controlling the optimum operating conditions. The signals derived from the output of the network 46 are delivered to the forward input F of the counter 50 causing it to count in the forward direction.

The output signals from the network 46 are also delivered to a binary rate multiplier 54 which multiplies this information by the output signals $C/k$ from the counter 50. The train of output signals from the network 54 is then delivered through the buffer 52 to the backward input B of the counter 50.

At any time the count of the counter is the control value $C/k$. The counter will count forward according to the pulse train $k_{opt}G_2(t)$ and will count backward according to the pulse trains $(1-\Delta H)G_1(t)$ and $G_2(t)C/k$. Therefore, at any time the count in the counter will be:

$$C/k = G_2(t)K_{opt} - G_1(t)(1-\Delta H) - C/kG_2(t)$$

Collecting terms for $C/k$ we obtain $$C/k(1+G_2(t)) = G_2(t)K_{opt} - G_1(t)(1-\Delta H)$$

Therefore, the control relation C becomes $$C = k\left[\frac{G_2(t)K_{opt} - G_1(t)(1-\Delta H)}{1+G_2(t)}\right]$$

However, after the process has been in operation for only a very short time, the number of pulses representing $G_2(t)$ becomes very large compared to unity, so that the above relationship becomes $$C = k\left[\frac{G_2(t)K_{opt} - G_1(t)(1-\Delta H)}{G_2(t)}\right]$$

which reduced to the desired control relationship $$C = k\left[K_{opt} - \frac{G_1(t)(1-\Delta H)}{G_2(t)}\right]$$

This digitally encoded control value $C/k$ is continuously available at the output of the forward-backward counter 50 and may be used to directly drive a shaft actuating valve 11 via a shaft-to-digital converter 53 and comparator or, alternatively, may be first converted to a proportional voltage in a voltage-to-digital converter to obtain proportional control power.

The applications discussed represent but a few of the industrial control mechanisms which have been instrumented with magnetic operational-digital techniques.

The advantages of the operational-digital technique with respect to other techniques may best be realized when the precision and accuracies required are more stringent than can be economically obtained with model-like analog components; where the process is repetitious so that a special-purpose unprogrammed type of instrumentation can be employed; and where factors such as long life and ease of maintenance are of great importance.

It will be obvious to those skilled in the art that the invention may find wide application with appropriate modification to meet the individual design circumstances, but without substantial departure from the essence of the invention.

This application is a continuation-in-part of my now abandoned application Serial No. 549,398, filed November 28, 1955.

What is claimed is:

1. Apparatus for providing a signal characteristic of the rate material is conveyed comprising a conveyor arranged to carry material deposited thereon, regulator means for controlling the rate at which material is deposited on the conveyor, a pulse generator arranged to provide a train of pulses at a rate proportional to the rate of movement of said conveyor, means for measuring the weight of material on the conveyor and continuously providing a parallel binary weight signal, and a binary rate multiplier responsive to the weight signal and the pulse train for providing an output signal having a rate which is a measure of the rate material is carried along the conveyor.

2. Apparatus as set forth in claim 1, further including a second binary rate multiplier having one of its inputs connected to the output of the first mentioned rate multiplier, and humidity sensing means for providing a parallel binary signal to the other input of the second binary rate multiplier.

3. Apparatus for controlling the rate of delivery of material comprising a source of material, a regulator for controlling the rate at which material is emitted from said source, a conveyor for transporting said material along a path, a pulse generator for producing pulses at a rate proportional to the rate of translation of said material along said path, means for measuring the weight of material on said conveyor to continuously provide a parallel binary weight signal, a binary rate multiplier responsive to said weight signal and said pulses for providing an output signal having a rate which is a measure of the rate material is carried along said conveyor, and said regulator being controlled by the output of said multiplier.

4. Apparatus for controlling the rate of delivery of material to a grader of the type having first and second outputs comprising a regulator for controlling the rate at which material is delivered to the input of said grader, first and second conveyors respectively receiving material from the first and second outputs of said grader, first and second signal generators actuated respectively by said first and second conveyors to produce pulses at a rate proportional to the translation of material, first and second weighing means for producing a binary weight signal corresponding respectively to the weight of material on said first and second conveyors, first and second binary rate multipliers responsive respectively to the pulses of said first and second signal generators and the binary weight signal of said first and second weighing means, a forward-backward counter having one of its input coupled to the output of said first multiplier and its other input coupled to the output of said second multiplier, and means responsive to the output of said counter for governing said regulator.

References Cited in the file of this patent

UNITED STATES PATENTS 2,371,040     Fisher et al. _____ Mar. 6, 1945